US006394600B1

(12) United States Patent
Horn et al.

(10) Patent No.: US 6,394,600 B1
(45) Date of Patent: May 28, 2002

(54) REPLACEABLE LENS SYSTEM

(75) Inventors: Michael Horn, Berlin; Hartmut Kintzel, Luebeck, both of (DE)

(73) Assignees: Auergesellschaft GmbH; Dreagerwerk AG, both of (DE)

( * ) Notice: Subject to any disclaimer, the term of this patent is extended or adjusted under 35 U.S.C. 154(b) by 0 days.

(21) Appl. No.: 09/749,300

(22) Filed: Dec. 27, 2000

(30) Foreign Application Priority Data

Jan. 4, 2000 (DE) .......................................... 100 00 403

(51) Int. Cl.[7] .................................................. G02C 5/00
(52) U.S. Cl. .......................................... 351/154; 351/43
(58) Field of Search ............................ 351/154, 41, 43, 351/62

(56) References Cited

U.S. PATENT DOCUMENTS 3,051,957 A * 9/1962 Chan .......................... 351/154
6,282,728 B1 * 9/2001 Baragar et al. ............... 351/43

* cited by examiner

*Primary Examiner*—Huy Mai
(74) *Attorney, Agent, or Firm*—Welsh & Katz, Ltd.

(57) ABSTRACT

This invention relates to a replaceable eye-protecting lens system for breathing masks that is easy to handle and ensures a firm and safe, i.e. gas-tight fit of the lenses in the body of the mask. It is the object and problem of this invention to create a replaceable eye-protecting lens system that provides a wide field of vision for the person wearing the mask and ensures a mechanically firm and gas-tight fit of mask body and lens. This problem is solved according to the invention by creating a replaceable lens system for breathing masks wherein a groove-shaped holding fixture 5 is placed on the rim of eye-protecting lens 1 which holds a fastening element 2 of the mask body and a locking ring 4.

4 Claims, 1 Drawing Sheet

REPLACEABLE LENS SYSTEM

This invention relates to a replaceable eye-protecting lens system for breathing masks that is easy to handle and ensures a firm and safe, i.e. gas-tight fit of the lenses in the body of the mask.

The state of the art includes a multitude of solutions wherein the fit of mask body and lens or lenses is ensured by inserting the one into a groove of the other and connecting them with a fastening means. For example, DE 92 18 061 U1 features a sealing rim for a solid mask body that comprises a bracket to join said sealing rim with a fastening clip. The disadvantage of this solution is that manufacturing the components is expensive and complicated, manual assembly is difficult, and the joint is relatively large in design, which diminishes the wearer's field of vision. Another joining solution known from the market is that groove-shaped recesses in the mask body and groove-shaped recesses in the eye-protecting lens are nested and a wire-shaped fastener snaps shut. The disadvantage of this solution is the relatively large design and the fact that the mask body and lens are joined on the outer side of the mask, requiring the joint to be highly resistant to chemicals and making it contamination-prone.

It is the object and problem of this invention to create a replaceable eye-protecting lens system that provides a wide field of vision for the person wearing the mask and a mechanically firm and gas-tight fit of mask body and lens.

This problem is solved according to the invention by creating a replaceable lens system for breathing masks wherein a groove-shaped holding fixture is placed on the rim of eye-protecting lens that holds a fastening element of the mask body and a locking ring.

The solution according to the invention provides a replaceable lens system that has small dimensions, ensures a wide field of vision for the person wearing the mask, and ensures both a safe and gas-tight fit of mask body and eye-protecting lens and automatic manufacturing.

The invention will be explained in more detail below, with reference to an embodiment as shown in the figures.

Figure 1:
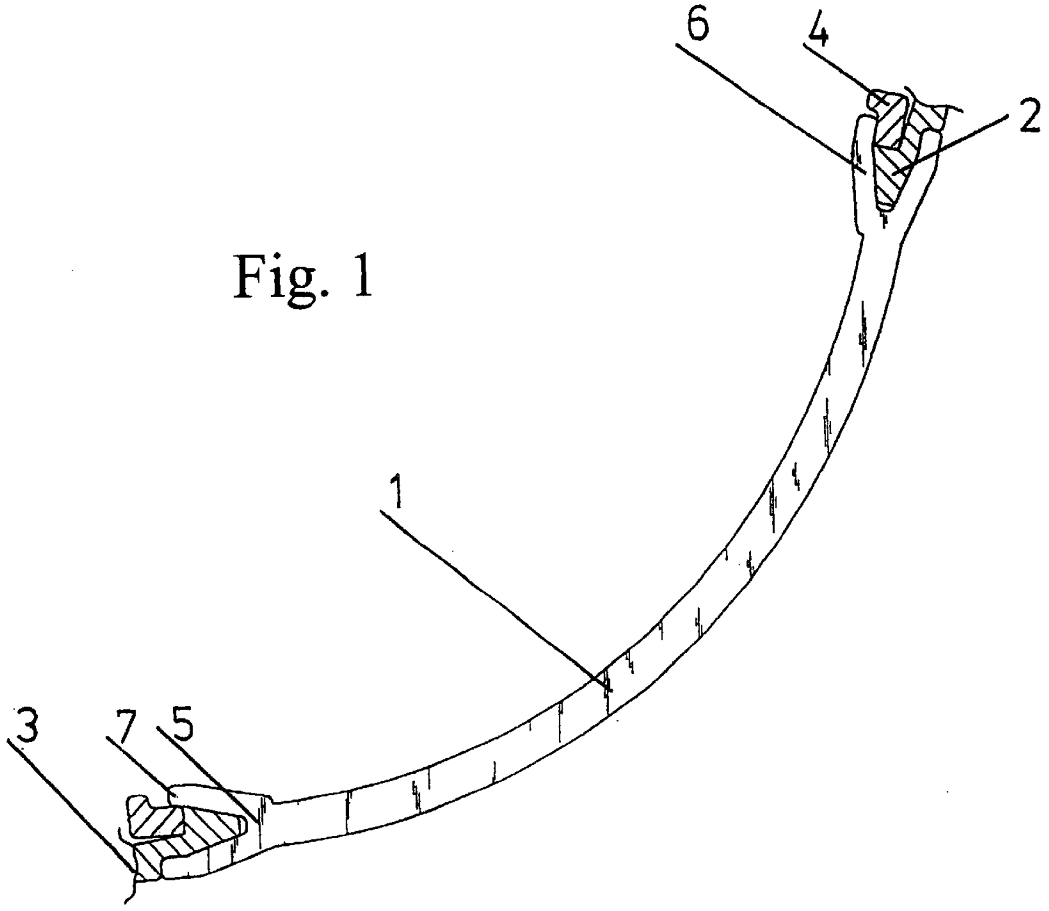

FIG. 1 shows a cross-sectional view of the replaceable lens system. For a breathing mask with two lenses, a groove-shaped holding fixture 5 is incorporated in eye-protecting lens 1 which engages with a snap-in, hammer-shaped fastening element 2 of mask body 3 and subsequently with a snap-in locking ring 4 on the inside of the breathing mask. This joint is made gas-tight by pressing the elastic mask body 3 between said locking ring 4 and said eye-protecting lens 1. Assembly according to the invention of said eye-protecting lens is easy and can be automated as said locking ring is nested at a great undercut into sections 6 of said eye-protecting lens 1 and pre-fixed there. Then it can be snapped in at a small undercut via sections 7 of said eye-protecting lens 1.

Figure 2:
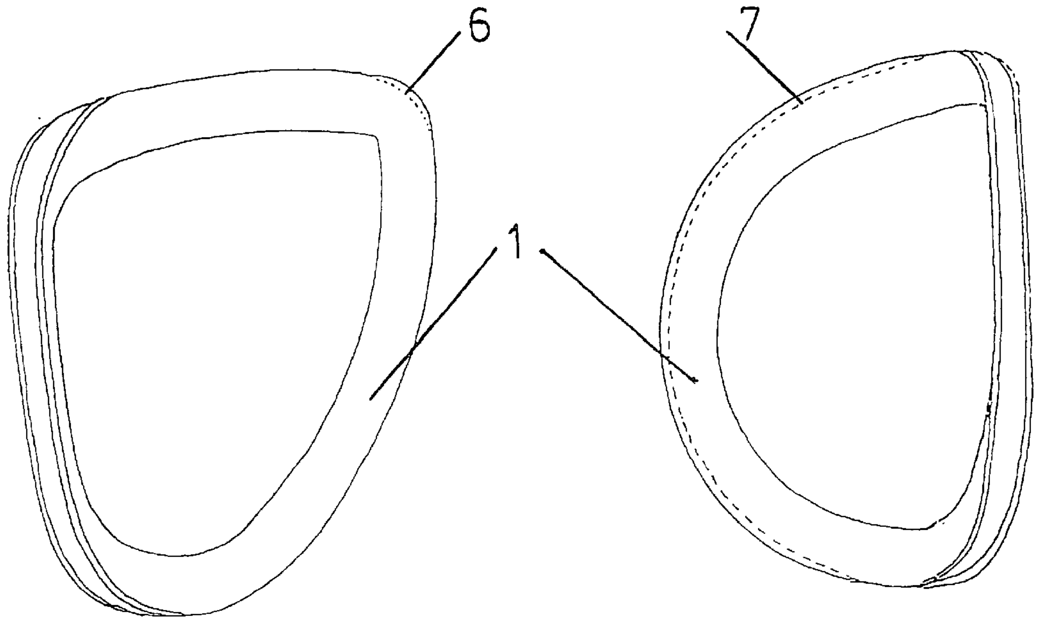

FIG. 2 shows an embodiment in which sections 6 and 7 of the eye-protecting lens 1 are shown at a great or small undercut to make assembly easier.

The replaceable eye-protecting lens system of the invention guarantees mechanical strength and gas-tightness at a range of temperature from −30° C. to +44° C. Another advantage of the solution according to the invention is that the locking ring 4 is placed inside the breathing mask where it is not subject to strict requirements regarding resistance to chemicals. Thus it can be made at low cost of a suitable elastic material, e.g. a polyamide, and destroyed, if required, and replaced by a new locking ring 4 whenever fast disassembly is necessary.

LIST OF REFERENCE SYMBOLS

1 Eye-protecting lens
2 Fastening element
3 Mask body
4 Locking ring
5 Holding fixture
6 Section with great undercut
7 Section with small undercut

We claim:

1. A replacement lens system for breathing masks comprising a groove-shaped holding fixture in the rim of an eye-protecting lens which holds a fastening element of a mask body and a locking ring.

2. The replaceable lens system for breathing masks according to claim 1 wherein said locking ring (4) is placed on the inside of said breathing mask.

3. The replaceable lens system for breathing masks according to claim 1 wherein said fastening element of said mask body is hammer-shaped and said locking ring is angular.

4. The replacement lens system for breathing masks according to claim 1 further includes a first extension wherein sections are placed at a great undercut for nesting and pre-fixing said locking ring in said groove-shaped holding fixture, and a second extension placed at a small undercut for snapping holding fixture of said eye-protecting lens to hold said locking ring.

* * * * *